United States Patent [19]

Hönlinger et al.

[11] Patent Number: 5,245,890
[45] Date of Patent: Sep. 21, 1993

[54] RESILIENT COUPLING WITH RELATIVE ROTATION LIMITATION

[75] Inventors: Herwig Hönlinger, Gross-Rohrheim; Jürgen Eichhorn, Weinheim, both of Fed. Rep. of Germany

[73] Assignee: Firma Carl Freudenberg, Weinheim, Fed. Rep. of Germany

[21] Appl. No.: 826,716

[22] Filed: Jan. 28, 1992

[30] Foreign Application Priority Data

Mar. 15, 1991 [DE] Fed. Rep. of Germany ....... 4108480

[51] Int. Cl.$^5$ ............................................. F16F 15/12
[52] U.S. Cl. ......................................... 74/574; 464/89; 464/162
[58] Field of Search ..................... 74/572, 574; 464/89, 464/162, 160

[56] References Cited

U.S. PATENT DOCUMENTS

| 1,843,787 | 2/1932 | Russell et al. | 464/89 X |
| 2,616,274 | 11/1952 | Landrum | 464/160 |
| 3,033,011 | 5/1962 | Garrett | 464/89 X |
| 4,153,260 | 5/1979 | Joyner | 464/162 X |
| 4,667,530 | 5/1987 | Mettler et al. | 464/162 X |
| 4,862,976 | 9/1989 | Meek | 464/162 X |

FOREIGN PATENT DOCUMENTS

| 2744051 | 4/1979 | Fed. Rep. of Germany | 74/574 |
| 1290685 | 3/1962 | France | 464/162 |
| 146745 | 9/1983 | Japan | 74/574 |
| 137443 | 6/1987 | Japan | 74/574 |

Primary Examiner—Leslie A. Braun
Assistant Examiner—Khoi Q. Ta
Attorney, Agent, or Firm—Sprung Horn Kramer & Woods

[57] ABSTRACT

A resilient coupling with relative rotation limitation. The coupling comprises an annular hub that fits into a concentric annular flywheel while separated from it at least to some extent by a radial interval such that the flywheel can rotate relative to the hub. A spring element of elastomeric material is accommodated between the hub and the flywheel. The hub has a first flange that extends radially outward and the flywheel has a second flange that extends radially inward such that the hub and flywheel respectively reinforce each other while permitting relative rotation. The first flange on the hub has recesses that open toward the flywheel and the second flange on the flywheel has recesses that open toward the hub. The first and second flanges overlap in the region of the recesses with the edges of the recesses forming opposing contact surfaces. The opposing contact surfaces are so delimited in the circumferential direction as to provide separation in at least one direction of the rotation.

17 Claims, 4 Drawing Sheets

RESILIENT COUPLING WITH RELATIVE ROTATION LIMITATION

BACKGROUND OF THE INVENTION

The present invention relates to a resilient coupling. The coupling comprises an annular hub that fits into a concentric annular flywheel while separated from it at least to some extent by a radial interval such that the flywheel can rotate relative to the hub. A spring element of elastomeric material is accommodated between the hub and the flywheel. The hub has a first flange that extends radially outward and the flywheel has a second flange that extends radially inward, whereby the hub and the flywheel respectively reinforce each other while permitting relative rotation.

A resilient coupling of this type is known from German Patent Publication No. OS 3 913 547. This coupling is intended to suppress rotary vibrations and essentially comprises a hub that fits into a flywheel with a rubber spring element between them. The resilient coupling prevents wobbling when the flywheel's center of gravity shifts to one side of a the device's neutral axis. When the hub and the flywheel are caused to rotate extensively in relation to each other, the spring element can overextend or sustain damage, severely limiting the resilient coupling's life. The known resilient coupling is also rather thick in the axial direction.

SUMMARY OF THE INVENTION

A principal object of the present invention is to improve a resilient coupling of the aforesaid type in such a manner that it will occupy less space and have extended life.

This object, as well as other objects that will become apparent from the discussion that follows, are achieved, in accordance with the invention, by providing the first flange on the hub with recesses that open toward the flywheel and providing the second flange on the flywheel with recesses that open toward the hub, wherein the first and second flanges overlap in the region of the recesses. The flange portion inserted in the recesses are circumferentially shorter than the respective recesses thereby creating gaps between the edges of the recesses and the inserted flange portions at least at one circumferential edge. The impact surfaces will accordingly meet and limit the extent of rotation between the hub and the flywheel.

Combining proper mounting with relative rotation limitation in one and the same unit prolongs the life of the resilient coupling while maintaining satisfactory operating characteristics. A reinforcement of the annular hub within the flywheel or the flywheel on the hub is provided for applications that entail little radial stress on the coupling. Such embodiments are distinguished by being simple and inexpensive to manufacture.

When the resilient coupling is subjected to greater radial stress, the hub and flywheel can rest against each other such that the two facing edges of the flanges have a gap between them in each direction of rotation or at least in one direction of rotation with a gap at one or both ends. When the impact surfaces are separated in only one direction of rotation and when the resilient coupling is employed as intended, tension is applied to ensure approximately equal gaps between the facing impact surfaces. If the resilient coupling is employed in both directions, the flanges will be approximately in the middle of the open recesses that surround them. The advantage is that one and the same resilient coupling can be employed in different applications. Increased wear in the vicinity of the bearing surfaces, due to the self-alignment and very acute angle of rotation (on the order of no more than ±15° from a midpoint), can be avoided by using the right combination of materials. It is also possible, if necessary, to fill the resilient coupling with a viscous lubricating and vibration suppressing fluid. In this event the sliding contact surfaces must be well sealed to prevent the fluid from escaping or coming into contact with the spring element and shortening the resilient coupling's life. Vibration suppressing fluids of different viscosity or coefficients of friction can be employed to further control the resilient coupling's vibration suppression properties. The cross section of the flange can be varied to limit the relative motion of the hub and flywheel to a specific value. Channel-like access openings extending circumferentially through the flange bring about lower vibration suppression and greater stress on the elastomeric spring element. The narrower the access opening cross section, the greater will be the suppression.

The impact surfaces can parallel the axis and extend radially toward it. The advantage is that the impact surfaces of the flanges and the depressions in the hub and the flywheel are particularly simple and economical to manufacture.

The impact surfaces can be at an angle of 20° to 60° to an imaginary line intersecting the axis. The advantage of this configuration is that the hub and flywheel will automatically center in the event of great stress in the circumferential direction. This approach will minimize stress on the supporting sliding contact surfaces and considerably prolong the resilient coupling's life.

One practical embodiment of the invention has at least two recesses in the first and second flange distributed uniformly around the circumference. The stress on the individual impact surfaces will decrease as the number of depressions increases. To ensure economical manufacture, there will be preferably two to five recesses uniformly distributed around the circumference.

The flywheel can be integrated into the second flange and/or the hub into the first flange. Assembly will be facilitated due to the smaller number of parts to be aligned, fit will be improved, and the resilient coupling will be more economical to manufacture.

When the resilient coupling is to be severely stressed radially, the flanges can be provided with grooves that are filled with lubricant. The two halves that generate the friction can accordingly be made of the same resistant and inexpensive material without increasing wear and tear. Although it is particularly simple and economical to provide grooves in the flanges, they can also be provided in the facing surfaces.

The flywheel and the first flange and/or the hub and the second flange can have sliding contact surfaces of differing materials. Both metals and plastics can be employed. Using differing materials often has a beneficial effect on the friction between the surfaces and on wear. The emergency operations of resilient couplings that are provided with lubrication are also often definitely improved subsequent to a loss of lubricant. The sliding contact surfaces can, for example, be made of bronze alloys or of such plastics as PTFE or polyamide.

The sliding contact surfaces on the flanges can at least to some extent have a low friction coating. It is also possible for the sliding contact surfaces on the flywheel and/or the sliding contact surfaces on the hub at least to some extent to have a low friction coating. Depending upon the stress on the elastic coupling, the slider surfaces can be entirely or to some extent provided with a low friction coating made, for example, of plastic. The low friction coating can also be a sheet accommodated between the hub and the flywheel. The hub and/or the flywheel can also be made of plastic.

This embodiment is especially appropriate for resilient couplings that are not greatly stressed radially. It is unnecessary to lubricate the two halves, which simplifies both manufacture and operation.

In accordance with another embodiment, it is provided that at least the sliding contact surfaces on the hub or flywheel are hardened. This approach makes it possible to employ light and/or inexpensive materials, provided when necessary with a particularly resistant and/or low-friction surface. Both the spring characteristic of the spring element and the viscosity of the lubricant, if any, can accordingly be varied to establish the level of vibration suppression.

The preferred embodiments of the present invention will now be described with reference to the accompanying drawings.

BRIEF DESCRIPTION OF THE DRAWINGS

FIG. 1b an axial section through the resilient coupling of FIG. 1a.

FIG. 2b is an axial section through the resilient compiling of FIG. 2a.

FIG. 3c is an axial section through the resilient coupling of FIG. 3a.

FIG. 4b an axial section through the resilient coupling of FIG. 4a.

DESCRIPTION OF THE PREFERRED EMBODIMENTS

Figure 1A:
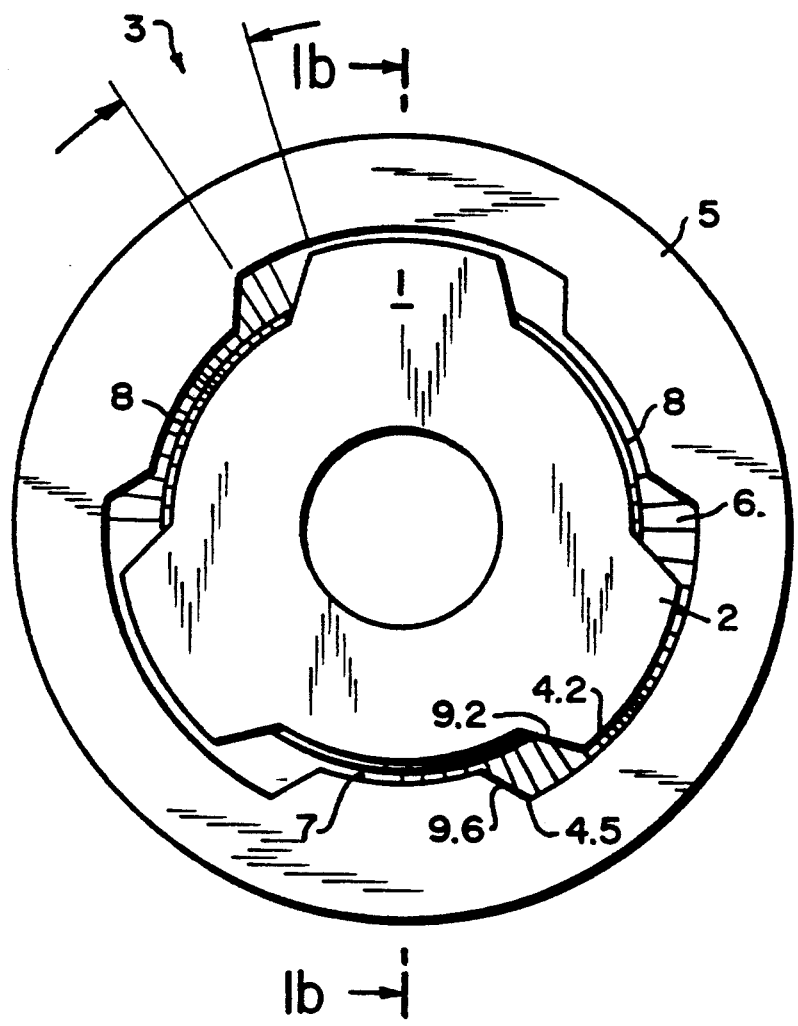
FIG. 1a is a plan view of a resilient coupling in accordance with a first preferred embodiment of the present invention.
Figure 1B:
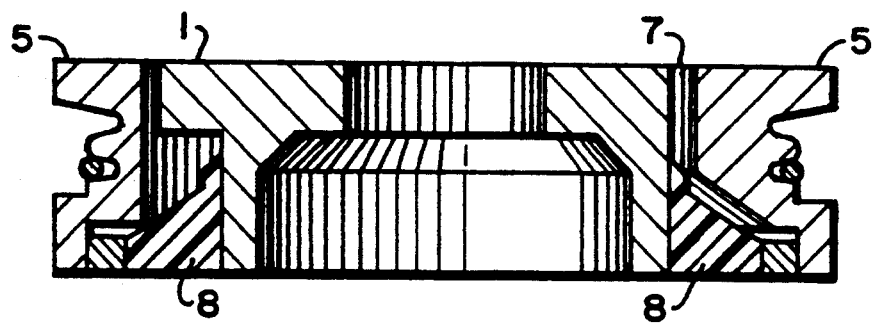

In the embodiment illustrated in FIG. 1, an integrated first flange 2 on the annular hub 1 is accommodated in the recesses in annular flywheel 5, providing sliding contact surfaces 4.2 and 4.5. A gap is provided between the flywheel flanges 6 and the hub 1.

Figure 2A:
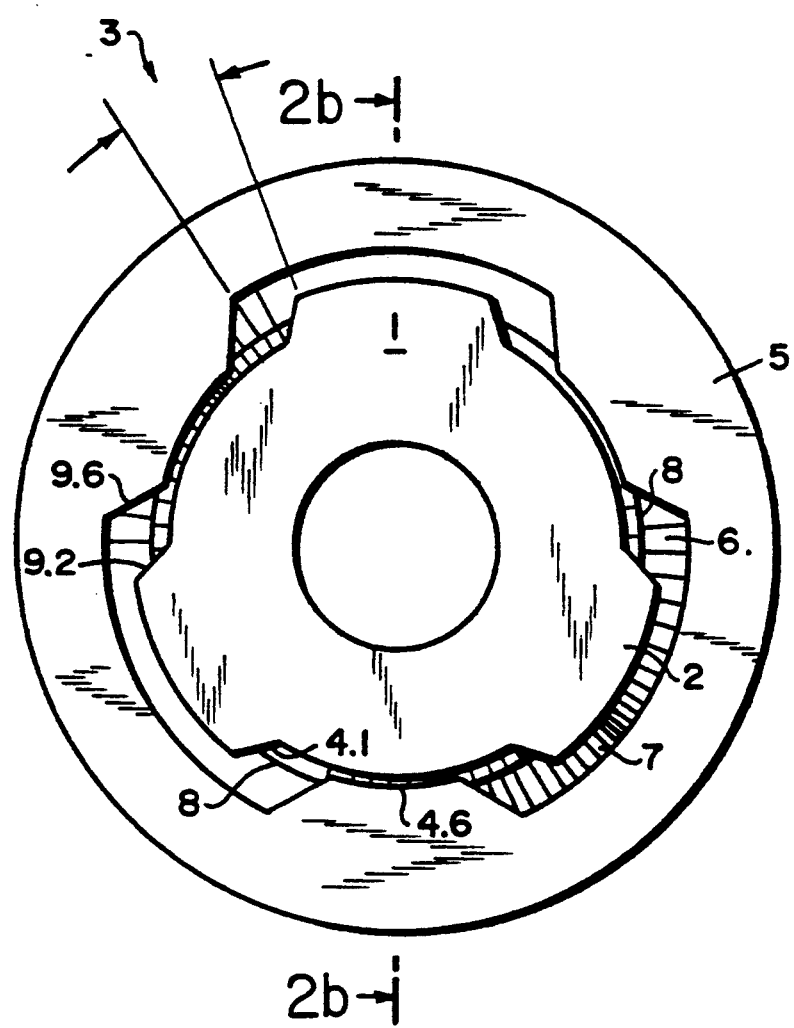
FIG. 2a is a plan view of a resilient coupling in accordance with a second preferred embodiment of the present invention.
Figure 2B:
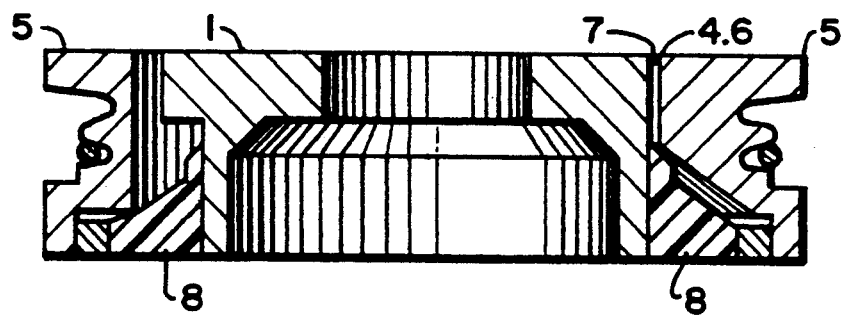

In the embodiment illustrated in FIG. 2 an integrated second flange 6 on an annular flywheel 5 is accommodated in the recesses distributed around the outer circumference of the annular hub 1 providing sliding contact surfaces 4.6 and 4.1. A gap 7 is provided between the hub flange 2 and the flywheel 5.

Figure 3A:
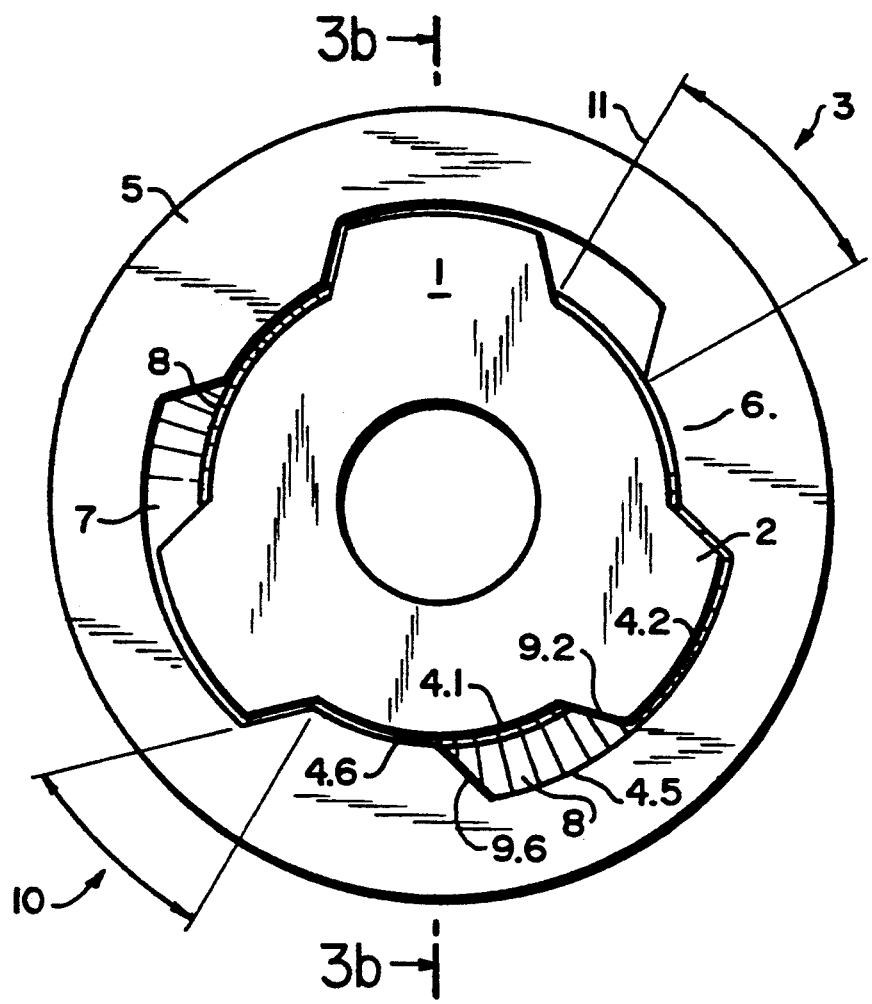
Figure 3B:
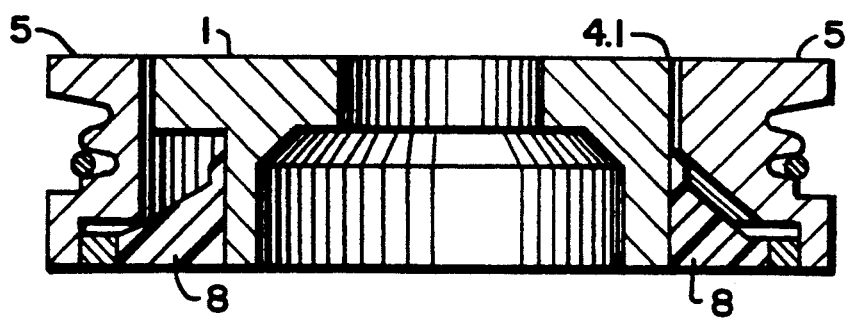
FIG. 3b is a plan view of a resilient coupling in accordance with a third preferred embodiment of the present invention.

The annular hub 1 and annular flywheel 5 illustrated in FIG. 3 rest against each other on by way of an integrated first flange 2 and a second flange 6, respectively, and can rotate in relation to each other. In this embodiment, the impact surfaces 9.2 and 9.6 are at an angle of 20° to 60° to an imaginary line 11 intersecting and perpendicular to the axis that also passes through the surfaces 9.2 and 9.6.

The resilient coupling comprises in FIGS. 1 to 3 essentially an annular hub 1, a flywheel 5 that at least partly surrounds the hub at a radial distance, and a spring element 8 of elastomeric material. Associated with hub 1 and flywheel 5 are impact elements in the form of a first flange 2 and a second flange 6, whereby flanges 2 and 6 are positioned in the same radial plane and are provided with open recesses and are positioned in the vicinity of the recesses engaging in each other. In accordance with FIGS. 1 and 2, the impact surfaces 9.2 and 9.6 of the first and second flanges 2 and 6 extend parallel to the axis of rotation and are aimed in the radial direction. In FIG. 3 impact surfaces 9.2 and 9.6 are positioned at an angle of 45° to an imaginary line 11 that is constructed perpendicular to the axis. At high stresses on the coupling and large deviations in the circumferential direction, hub 1 and flywheel 5 will center automatically and relieve the sliding contact surfaces 4.1 and 4.2 on the first flange and 4.6 and 4.5, respectively, on the second flange, prolonging the coupling's life. With a view to a quiet and extensively vibration-free concentricity of the elastic coupling, it is advantageous to minimize the mass of both coupling halves. Due to the relatively small angle 3 of relative rotation in the vicinity of ±15° from a mid-position, the wear and tear that can be expected on the sliding contact surfaces 4.1, 4.2 and 4.5, 4.6 with a material pairing of the friction producing surfaces that has been attuned to the particular application will be negligibly small. Preferably, the sliding contact surfaces 4.1, 4.2 are made of a different material than the mating surfaces 4.5, 4.6. For example, at least a portion of the sliding contact surfaces 4.2 on the first flange 2 and/or the sliding contact surfaces 4.6 on the second flange 6 have a low friction coating. Similarly, preferably at least a portion of the sliding contact surfaces 4.1 on the hub ring 1 or the sliding contact surfaces 4.5 on the flywheel ring 5 have a low friction coating. In the preferred embodiment of the present invention, the low friction coating is made of a plastic.

Further, it is desirable that the sliding contact surfaces 4.5, 4.2; 4.1, 4.6, are hardened to mimimize wear.

Figure 4A:
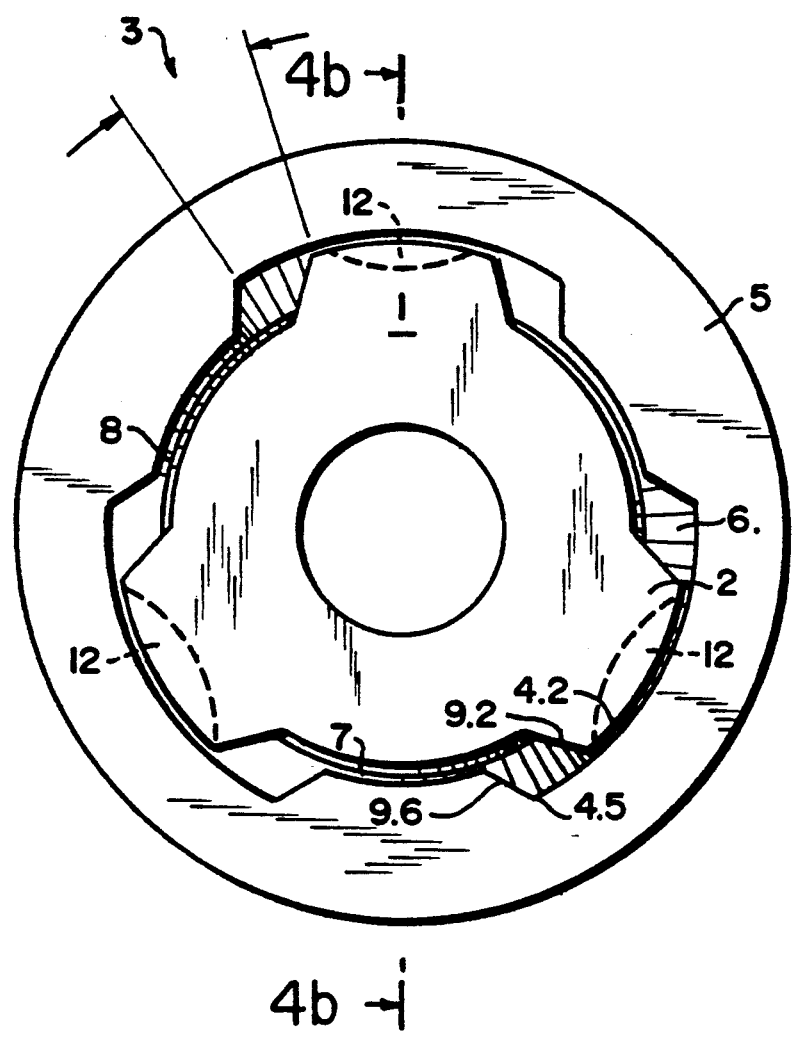
FIG. 4a is a plan view of a resilient coupling in accordance with a fourth preferred embodiment of the present invention.

FIG. 4 shows a resilient coupling similar to that of FIG. 1 with the exception that the first flange 2 of the annular hub 1, includes lubricating grooves 12. The lubricating grooves are filled a lubricant, such as oil or grease, during operation of the resilient coupler. This lubricant reduces the friction between the sliding contact surfaces 4.2 and 4.5 of the hub 1 and flywheel 5, respectively.

Figure 4B:
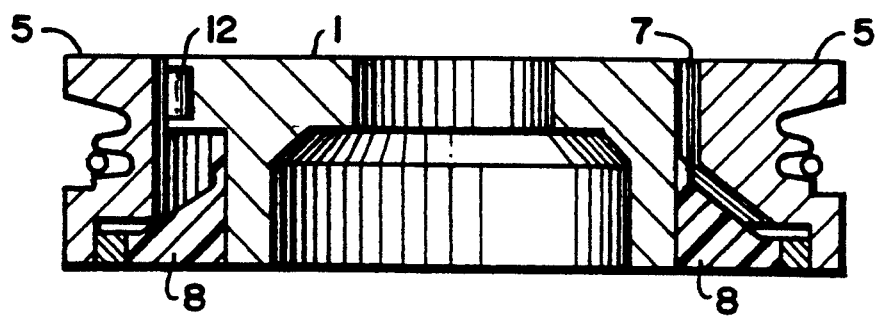

The radial depth of the grooves can be seen in the cross-sectional view of FIG. 4b.

Lubricating grooves of the type found in the embodiment of FIG. 4 can also be employed on the second flange 6 in the embodiment of FIG. 2 or in both the first and second flanges 2 and 6 in the embodiment of FIG. 3.

The resilient coupling that combines reinforcement and rotation limitation in accordance with the invention exhibits satisfactory operational properties and a long life and is of highly compact structure, especially in the axial direction. The resilient coupling in accordance with the invention is accordingly useful in many applications.

There has thus been shown and described a novel resilient coupling which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a resilient coupling arranged on an axis of rotation, said coupling comprising an annular hub; an annular flywheel surrounding the hub and arranged concentrically therewith, the flywheel being separated from the hub by a radial interval such that the flywheel can rotate relative to the hub; and a spring element of elastomeric material disposed between the hub and the flywheel; the hub having a first flange that extends radially outward toward the flywheel, and the flywheel having a second flange that extends radially inward toward the hub; the improvement wherein the first flange on the hub has recesses that open toward the flywheel with edges on each side and the second flange on the flywheel has recesses that open toward the hub with edges on each side, wherein the first and second flanges overlap in the region of the recesses, with the edges of the recesses forming opposing impact surfaces, and the opposing impact surfaces of the first and second flanges being so delimited in the circumferential direction as to provide a gap in at least one direction of rotation; and wherein the edges of the recesses in each flange extend at an angle of 20° to 60° to an imaginary line, intersecting and perpendicular to the axis, that passes through the edges.

2. The resilient coupling defined in claim 1, wherein the edges of the recesses in each flange extend parallel to the axis.

3. The resilient coupling defined in claim 1, wherein the edges of the recesses in each flange extend radially toward the axis.

4. The resilient coupling defined in claim 1, wherein each flange has at least two recesses distributed uniformly around the circumference.

5. The resilient coupling defined in claim 1, wherein the flywheel is integrated into the second flange.

6. The resilient coupling defined in claim 1, wherein the hub is integrated into the first flange.

7. The resilient coupling defined in claim 1, wherein at least one of the first and second flanges have a plurality of grooves that can be filled with lubricant.

8. The resilient coupling defined in claim 1, wherein the flywheel and the first flange on the hub, respectively, have sliding contact surfaces of differing materials.

9. The resilient coupling defined in claim 1, wherein the hub and the second flange on the flywheel, respectively, have sliding contact surfaces of differing materials.

10. The resilient coupling defined in claim 8, wherein at least a portion of the sliding contact surfaces on the first flange have a low friction coating.

11. The resilient coupling defined in claim 9, wherein at least a portion of the sliding contact surfaces on the second flange have a low friction coating.

12. The resilient coupling defined in claim 8, wherein at least a portion of the sliding contact surfaces on the flywheel have a low friction coating.

13. The resilient coupling defined in claim 9, wherein at least a portion of the sliding contact surfaces on the hub have a low friction coating.

14. The resilient coupling defined in claim 12, wherein the coating is plastic.

15. The resilient coupling defined in claim 13, wherein the coating is plastic.

16. The resilient coupling defined in claim 8, wherein at least the sliding contact surfaces are hardened.

17. The resilient coupling defined in claim 9, wherein the sliding contact surfaces are hardened.

* * * * *